Figure 8:
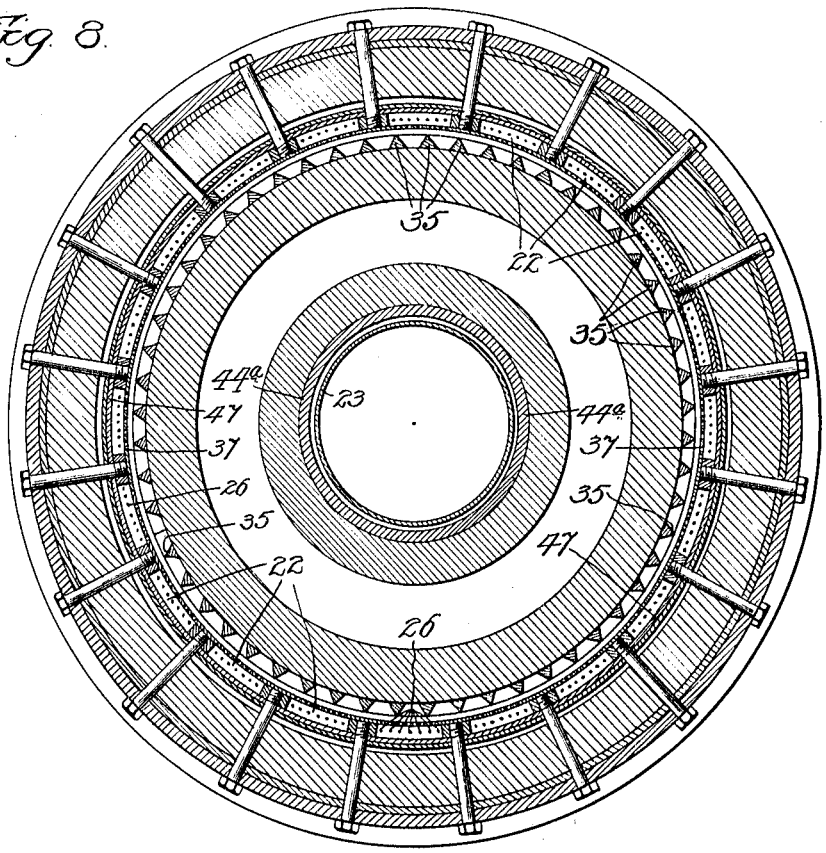

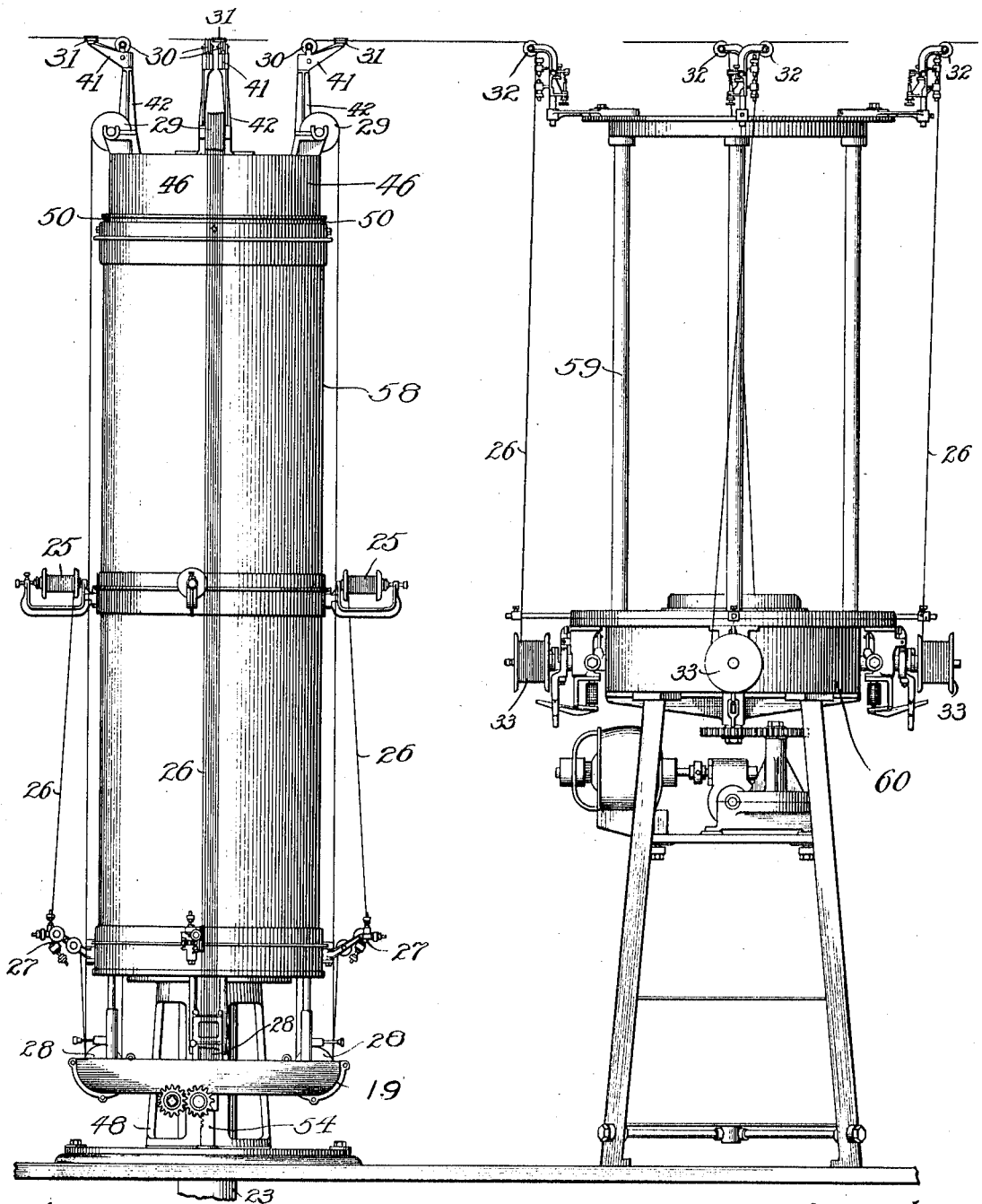

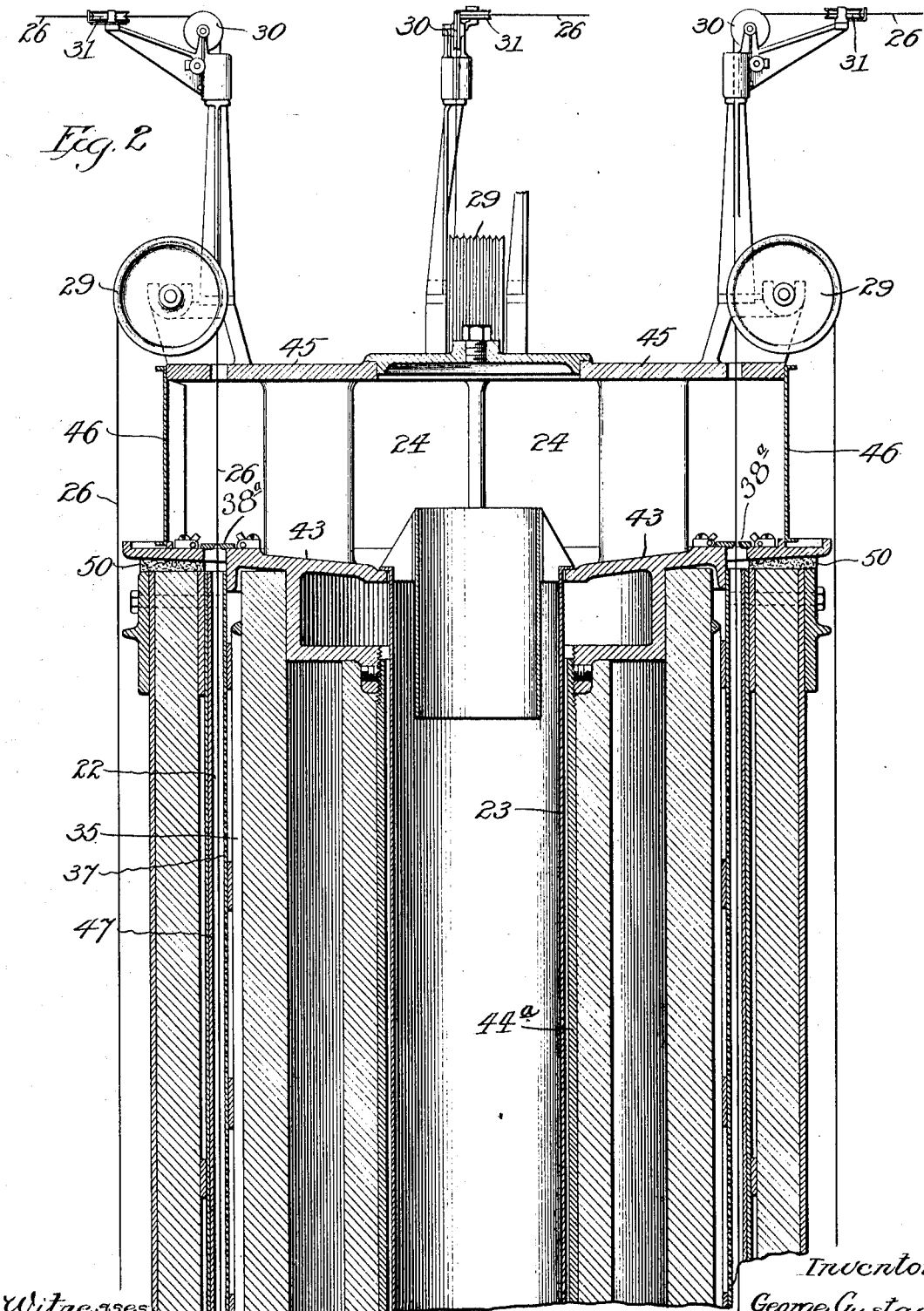

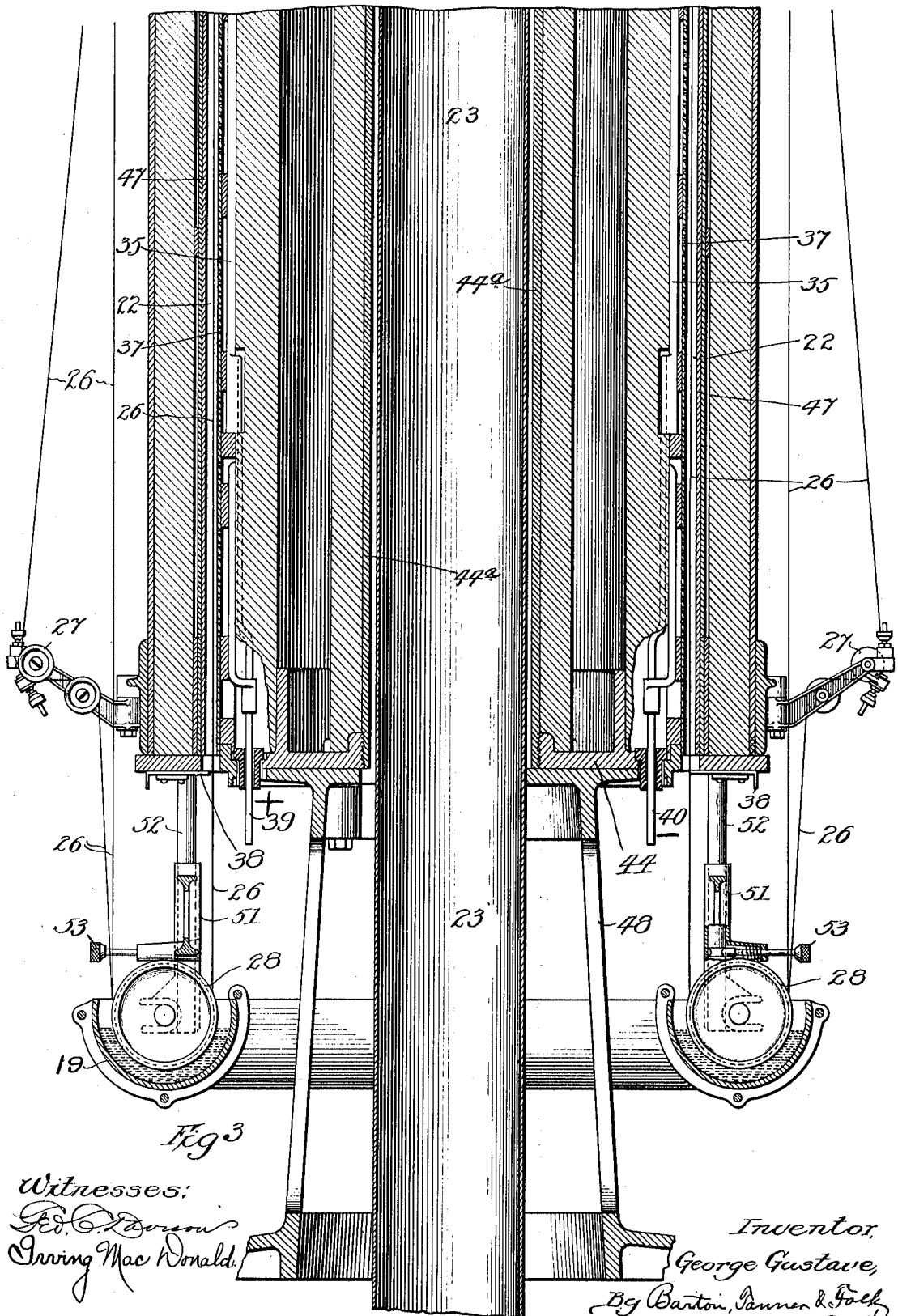

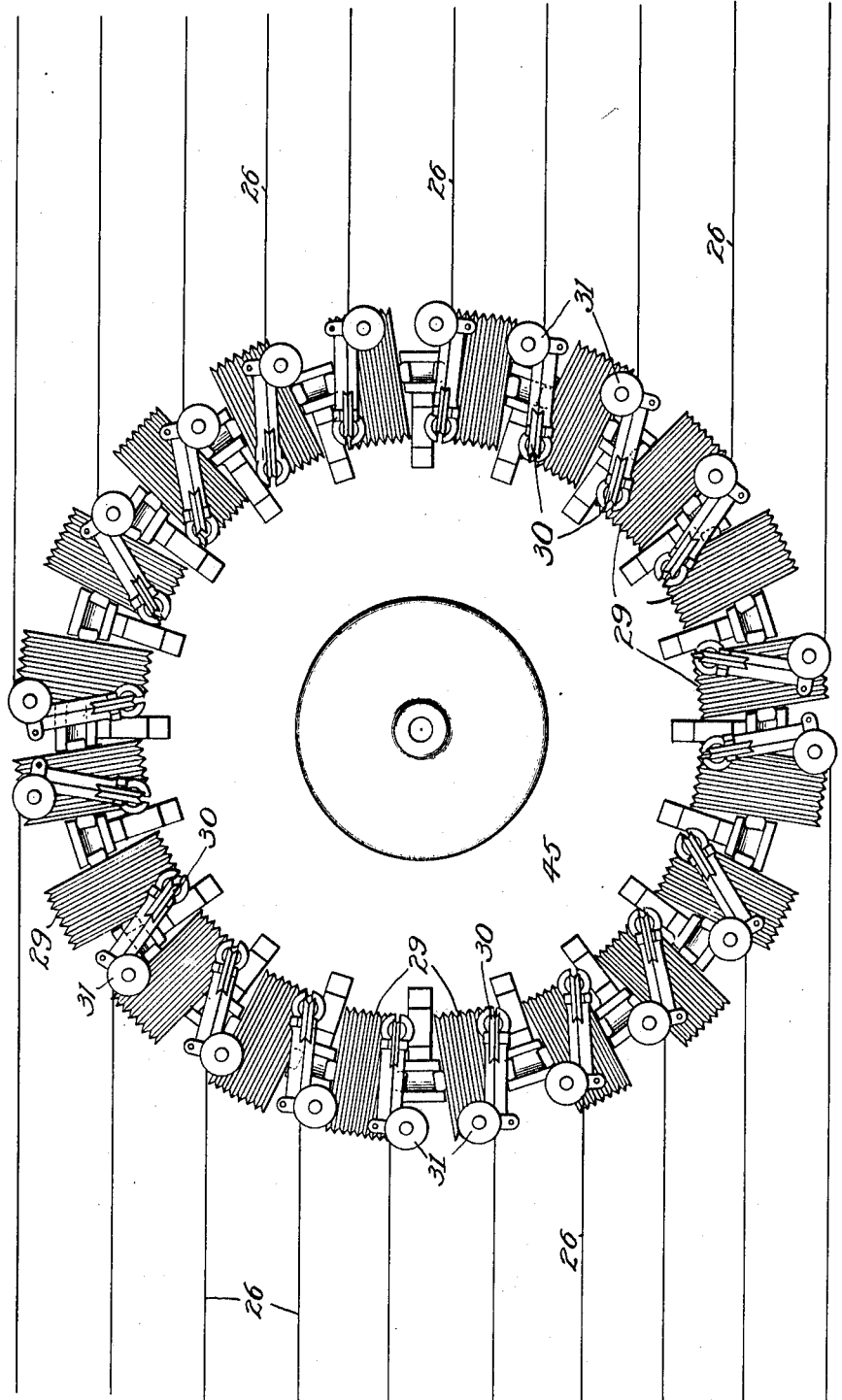

G. GUSTAVE.
MACHINE FOR COATING WIRE.
APPLICATION FILED OCT. 21, 1907.
1,004,251.
Patented Sept. 26, 1911.
6 SHEETS—SHEET 5.
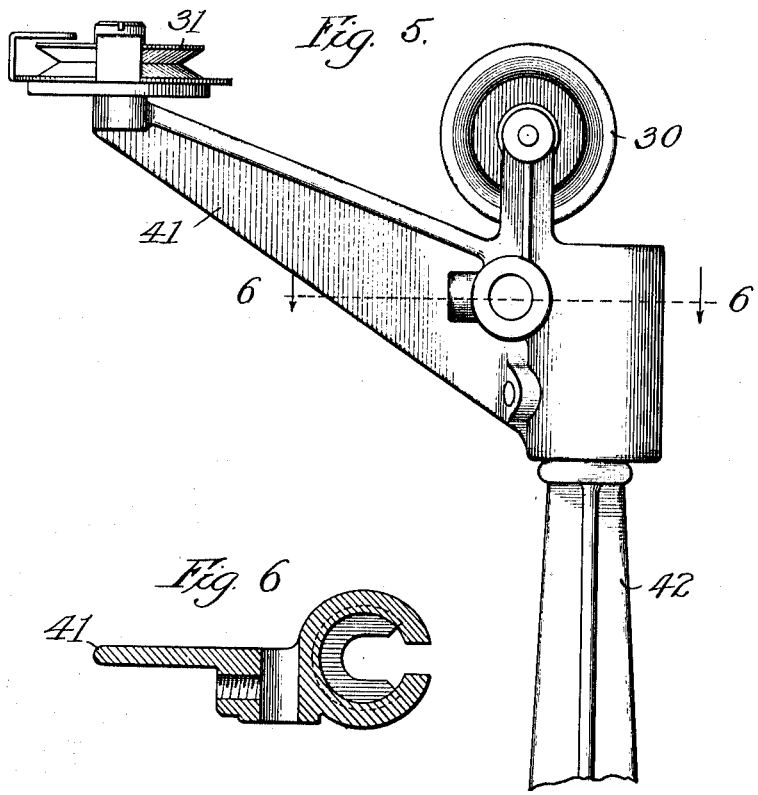
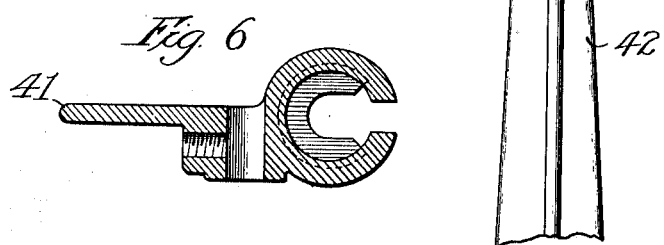
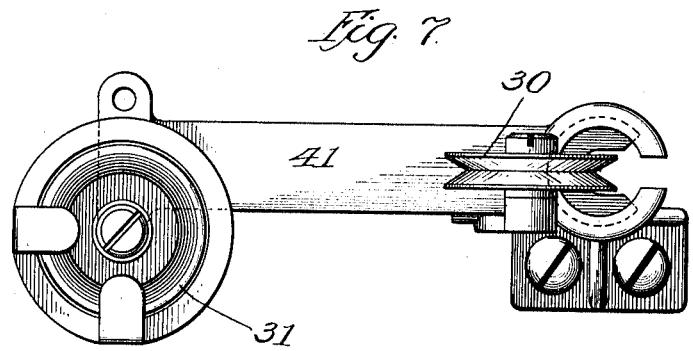
Witnesses:
Geo. C. Dewein
Irving MacDonald
Inventor,
George Gustave,
By Barton, Tanner & Foek
Attys.

G. GUSTAVE.
MACHINE FOR COATING WIRE.
APPLICATION FILED OCT. 21, 1907.

1,004,251.

Patented Sept. 26, 1911.

6 SHEETS—SHEET 6.

Witnesses:

Inventor,
George Gustave.
By Barton, Tanner & Folk
Att'ys

UNITED STATES PATENT OFFICE.

GEORGE GUSTAVE, OF CHICAGO, ILLINOIS, ASSIGNOR TO WESTERN ELECTRIC COMPANY, OF CHICAGO, ILLINOIS, A CORPORATION OF ILLINOIS.

MACHINE FOR COATING WIRE.

1,004,251.  Specification of Letters Patent.  Patented Sept. 26, 1911.

Application filed October 21, 1907. Serial No. 398,327.

*To all whom it may concern:*

Be it known that I, GEORGE GUSTAVE, citizen of the United States, residing at Chicago, in the county of Cook and State of Illinois, have invented a certain new and useful Improvement in Machines for Coating Wire, of which the following is a full, clear, concise, and exact description.

This invention relates to a machine for applying and baking insulating enamel coating upon wire, and its object is to provide a machine of improved construction which will be capable of handling the wires from a large number of spools without undue complication of apparatus, and in which a uniform heat may be applied to all the wires undergoing treatment.

Further objects are to improve the construction of the furnace in which the wires are baked; to make all the working parts readily accessible; to provide for stopping the travel of any of the wires without interfering with the others; to provide for taking off the coated wire from the machine at any desired angle, and to provide for the convenient operation of a number of coating machines in a small space, without interfering with their efficient operation or unduly hindering the examination, repair or control of the various parts.

Machines have heretofore been devised by which wire can be coated with insulating enamel, and the enamel baked on the wire after each coating. Such a machine consists essentially in a furnace having a set of sheaves at each end, over which the wire to be coated is passed, and by which it is passed repeatedly through the furnace, the wire being passed through insulating enamel contained in a suitable trough, before passing into the furnace. Considerable difficulty has been experienced in securing a uniform temperature in the furnace, this being essential in order that the various wires undergoing treatment shall be uniformly baked. Either too high or too low a degree of heat impairs the quality of the insulating enamel. In a long and narrow furnace chamber, such as has been used heretofore, it is found that there is a tendency for the heated vapors to form a current through the central portion of the chamber, so that the heat is not uniform throughout. Another difficulty has been that no convenient means has been provided for individually controlling the various wires, the result being that when the machine is shut down on account of a difficulty with one of the wires, the other wires are held in the furnace too long. There has further been considerable difficulty in threading the various wires through small and inaccessible openings, and further trouble has been experienced by reason of the heated vapors depositing a sticky coating upon the sheaves by which the wires are passed into and out of the furnace. These and other objectionable features have been overcome in the machine shown in the accompanying drawings, in which the coating apparatus is arranged about a cylindrical heating furnace provided with means for discharging the heated vapors downwardly through a centrally-disposed discharge pipe. A very large number of wires can be conveniently treated with such an apparatus, the sheaves for carrying the wires being disposed at the ends of the furnace at intervals around its circumference. The trough containing the insulating compound to be applied to the wire may conveniently be of an annular form, arranged at the bottom of the furnace in such a manner that the edges of the sheaves will dip into the insulating compound and carry the wires through it just before they are passed into the furnace. The wire may thus be given any desired number of individual coats of insulating enamel each coat being separately baked by the passage of the wire through the furnace. Finally the wire may be led out through the top over suitable guide pulleys to a reeling machine where it is wound upon spools. The wire-carrying apparatus, being arranged around the outside of the cylindrical furnace, is all conveniently accessible, and each wire can be individually controlled without interfering with any of the others.

Figure 9:
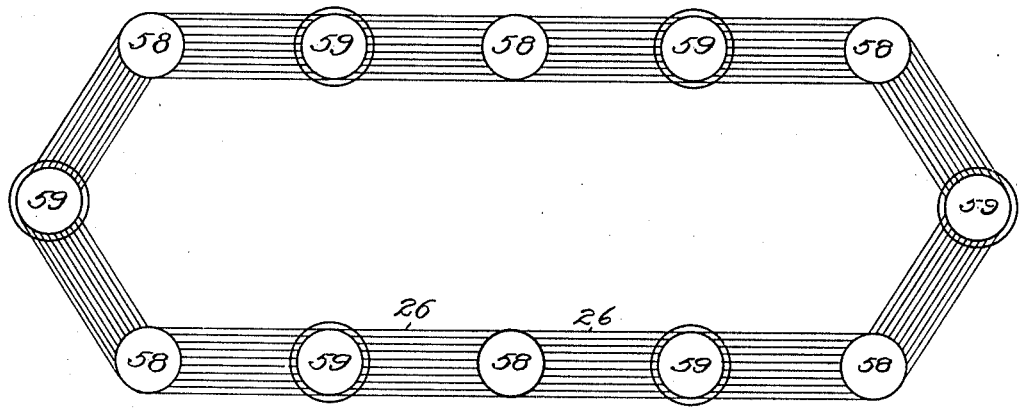

In the accompanying drawings Figure 1 is a view in elevation of the wire coating machine constructed in accordance with this invention; this view also showing a machine for receiving and reeling up the various wires from the coating apparatus; Fig. 2 is a view in sectional elevation showing the upper portion of the coating machine; Fig. 3 is a similar view in sectional elevation showing the lower portion of the machine; Fig. 4 is a plan view of the machine showing how the various wires after being coated are led away to either side to be reeled up on spools; Fig. 5 is a detail view of the mounting for one of the sets of guide pulleys at the top of the machine over which the wire is led away; Fig. 6 is a detail cross-sectional view on line 6—6 of Fig. 5; Fig. 7 is a detail plan view of the guide pulleys and mounting therefor shown in Fig. 5; Fig. 8 is a sectional plan view of the furnace, omitting the wire carrying reels, etc.; and Fig. 9 is a diagram illustrating how a number of coating machines and reeling machines can be assembled efficiently in small compass.

The same characters of reference designate the same parts wherever they are shown.

The furnace is in the form of an upright cylinder having an annular furnace chamber 22 and a central discharge pipe 23 leading out through the bottom. A chamber 24 is provided at the top of the furnace affording communication between the annular furnace chamber and the mouth of the central discharge pipe for the heated vapors. The wire to be coated is drawn from spools 25 which may be mounted at intervals around the exterior of the cylinder furnace, as shown most clearly in Fig. 1. For the sake of clearness, only four sets of wire-carrying apparatus are shown in Fig. 1; but it will be understood that the machine will accommodate the carrying-apparatus for a large number of wires, the sheaves being radially-disposed and mounted as closely together as may be. Fig. 4 shows the upper sheaves for twenty individual wires. Referring again to Fig. 1, it will be seen that each wire 26 is led from its spool 25 through guide rollers 27 onto the coating sheave 28, and after passing around said sheave is led upward through the annular furnace chamber to a sheave 29 at the top of the furnace. Each of the sheaves 28 and 29 is provided with a number of grooves, so that the wire may be passed around said sheaves and through the furnace as many times as may be desired. The lower sheave 28 dips into the liquid enamel contained in the annular coating trough 19, so that the wire receives its coating of enamel before being passed into the furnace. After the last coating of enamel has been applied and baked on the wires, said wires are led out through the top of the furnace over guide pulleys 30 and 31, and from thence to the reeling machines, passing over guide pulleys 32 of said reeling machine onto the spools 33 on which it is wound. It will be understood that the spools 33 are driven by suitable motor mechanism. The reeling machine shown in the drawing is specially designed for use with the coating machine of this invention, and is described and claimed in Patent No. 966,827 of August 9, 1910.

The furnace is constructed of concentric cylinders of heat-insulating material, reinforced by metal in such a manner as to be strong and rigid. The furnace chamber proper is a narrow annular space 22, between concentric cylinders, and while divided by spacers into different compartments, to prevent interference between different lengths of wire, the chamber is practically continuous around the furnace, so that the heat is uniform throughout. The heat is preferably produced by means of cast-iron grids 35, through which an electric current of suitable strength is passed, these grids being mounted close together at intervals around the inner wall of the furnace chamber. A cylindrical perforated plate 37 is, however, interposed between the heating-grids 35 and the wires, in order to prevent said wires from coming into actual contact with the grids.

The refractory cylinders forming the annular furnace chamber may be conveniently made from lengths of magnesia pipe-covering of the required diameter and may be supported in metal end plates 43, 44 which are provided with circular shouldered portions, surfaces or recesses fitting the ends of cylinders. Said end plates 43 and 44 are preferably united by a metal cylinder or pipe 44ª which may be screwed into them, and form with said end plates, a rigid supporting frame for the cylinders of refractory material. The outside of the furnace is also covered by a metal cylinder, to support and protect the refractory material; and additional metal cylinders 37, 47, form a lining for the annular chamber through which the wires are passed.

The furnace is supported upon a pedestal base 48, the discharge pipe 23 extending down through the center of said base. The chamber 24 at the top of the furnace is formed by an end plate or roof 45, supported at a distance above the end plate 43 which fits over the ends of the concentric furnace-cylinders, the space between the plates 43 and 45 being inclosed by a cylindrical shell 46 forming the side wall of said chamber 24. The interstices between the ends of the outer furnace cylinder and the end plates may be filled by asbestos packing 50.

Suitable means are provided for creating a suction to exhaust the fumes through the discharge pipe 23, and it will be noted that the provision of the chamber 24 at the top of the furnace, affording communication between the furnace chamber and the discharge pipe, prevents the escape of any of the fumes into the air. The discharge pipe 23 being connected with apparatus for exhausting vapor, it will be seen that the pressure of air, where the wires emerge from the furnace, is such as to draw the air into the furnace instead of expelling the fumes therefrom. This is an important provision, because the fumes are not only extremely disagreeable, but are apt to deposit a thick coating upon the working parts of the apparatus. Damper-plates 38 are provided at the lower entrance to the furnace chamber for the purpose of regulating the admission of air. Damper-plates 38ª are also provided at the upper end of the annular furnace chamber where it communicates with the chamber 24. It will be appreciated that the temperature in the furnace chamber can be regulated very exactly, not only by regulating the supply of electric current, but also, in case the furnace suddenly becomes too hot, by increasing the admission of air by regulating the damper plates. The terminals by which the heating grids are connected to the source of electric current are shown in Fig. 3 as projecting through the lower end of the machine, and are designated by the numerals 39 and 40.

The guide-pulleys 30 and 31, over which the wire passes in leaving the machine, are preferably mounted upon a frame which is swiveled or pivoted in such a manner that while the groove in the pulley 30 is always kept in alinement with the groove in the sheave 29, the wire may be led away over the pulley 31 in any desired horizontal direction with respect to the axis of rotation of the swiveled frame. It will be understood that the frame or mounting 41 for the pulleys 30 and 31 is adapted to be rigidly secured in any desired angular position. The advantage of this construction will be apparent from Fig. 4, in which the twenty wires are shown being led away from the coating machine in opposite directions, each wire being separated from its neighbors by a considerable space so as to avoid danger of interference. The detailed construction of the mounting for the guide pulleys 30 and 31 is shown most clearly in Figs. 5 to 7 inclusive, and in Fig. 2. The frame 41 is pivotally mounted upon a post 42 extending upwardly at a point adjacent to the sheave from which the wire is to be drawn. The pivot of the frame 41 is concentric with a perpendicular from the last groove of the sheave 29; and the pulley 30 is mounted upon said frame 41 with its groove lying in the same perpendicular. The pulley 31 is mounted upon the end of the frame 41 and is preferably horizontally arranged so that the angle at which the wire leaves said pulley 31 may be varied in a horizontal plane without causing any frictional or other interference.

It will be seen that the various sheaves and pulleys are so disposed that the wire may be easily threaded around them, and that the direction of winding is the same throughout.

Each of the sheaves 28 is provided with trunnions which fit into bearing-slots or sockets in a frame 51, and this frame is mounted to slide up and down upon supporting rods 52 which extend downwardly from the lower end of the furnace. A spring-pressed lock-plunger 53 mounted in the sliding frame, is adapted to engage holes in the rods 52 to secure the frame in either its upper or lower position of adjustment. The sheave may thus be placed in position to dip into the insulating compound to just the extent desired, or it may be slid up to raise the sheave out of the coating trough and permit its removal, without disturbing any of the others.

The coating trough 19 may be adjustably supported upon vertical rods 54, 54, upon which it is arranged to slide. These rods are preferably provided with rack-teeth and the trough is then fitted with gear wheels meshing with said rack to raise and lower the trough by means of a handle which is arranged to turn said gear wheels.

Wire-coating machines of the type illustrated are especially adapted for use in association with reeling machines such as shown in the right-hand portion of Fig. 1. The coating machines and reeling machines are preferably assembled in alternation as indicated in the diagram, Fig. 9, each coating machine 58 being arranged to deliver the coated wires to the adjacent sides of the two or more reeling machines 59 which stand next to it. Preferably, the entire set of coating and reeling machines are arranged thus in what may be termed an endless chain, half of the total number of wires from each coating machine being delivered to the reeling machine on one side and the other half of said wires to the machine on the other side. But the circular arrangement of the wire-carrying mechanisms of the coating machine, and the corresponding circular arrangement of the individual spools of the reeling machine, each having swiveled guide pulleys at the top for delivering or receiving wires at any desired angles, make it possible to arrange the machines in groups of various formations, adapted to the particular configuration of the available floor-space.

I claim:—

1. A machine for coating wire, having a heating furnace arranged around a central discharge passage which is connected to receive the vapors from said furnace, and a plurality of wire-coating mechanisms associated with said furnace arranged to pass the coated wire longitudinally through said furnace chamber at intervals around its circumference.

2. In a machine for coating wire, the combination with a heating furnace, of wire-coating apparatus arranged to pass the coated wire through said furnace, a receiving chamber for the heated vapors at the end of the furnace chamber where the wire emerges therefrom, said wire being passed through and out of said receiving chamber, and means for exhausting the vapors from said receiving chamber.

3. In a machine for coating wires, the combination with a heating chamber arranged around a central discharge passage, a receiving chamber at the end of the furnace connecting the exit opening of the furnace chamber with said discharge passage, and a plurality of wire-coating mechanisms arranged to pass the coated wire longitudinally through said furnace chamber and receiving chamber at intervals around the circumference thereof.

4. In a machine of the class described, the combination with an annular furnace composed of a number of concentric cylinders, the inner cylinder forming a central discharge passage, and being connected by an intermediate passage 24 with said furnace chamber to receive the vapors therefrom of wire coating mechanisms associated with said annular furnace to pass the coated wire therethrough.

5. In a machine of the class described, an annular furnace composed of a number of concentric cylinders, in combination with a series of wire-coating mechanisms arranged around said annular furnace and adapted to pass the coated wires longitudinally through said annular furnace chamber at intervals throughout its circumference.

6. In a machine of the class described, the combination with an annular furnace comprising end plates and cylinders of refractory material assembled concentrically therebetween, of wire coating mechanisms associated with said furnace, means for passing the coated wire through said furnace, and electrical heating conductors disposed between said concentric cylinders.

7. In a machine of the class described, the combination with a vertical annular furnace chamber formed by concentric cylinders, the inner cylinder forming a discharge passage, of an annular coating trough mounted under the lower end of said furnace chamber, a chamber at the top of the furnace affording communication between the upper end of the annular chamber and the central discharge passage, sheaves arranged at intervals around said coating trough in position to carry the wire to be coated through the material in said trough and pass said wire upward into the furnace, and corresponding sheaves mounted above said upper chamber to receive the wire passed through said annular furnace chamber.

8. In a machine of the class described, the combination with an annular furnace chamber, of a series of spools carrying the wire to be coated, mounted at intervals around the exterior of the furnace chamber, a corresponding series of radially-disposed sheaves above and below the furnace chamber, adapted to pass the wire repeatedly through said chamber, means being provided for applying a coating to the wire previous to each entry thereof into the furnace chamber, guide-pulleys adapted to receive the wire after its final passage through the furnace, and means for reeling the wire from said guide-pulleys.

9. In a machine of the class described, the combination with an annular furnace chamber, of a series of sheaves above and below said chamber at intervals around the ends thereof, said sheaves being radially disposed with reference to said chamber and adapted to carry wire repeatedly through the same, guide-pulleys arranged to receive the wire from said sheaves after its last passage through the furnace chamber, and swivel mountings for said guide-pulleys, arranged to maintain the grooves in said pulleys in alinement with the grooves of the sheaves from which they respectively receive the wire, in any angular position of said pulleys.

10. In a wire-coating machine, the combination with a vertical annular furnace chamber having a central discharge pipe leading downwardly therefrom, of sheaves arranged above and below said furnace chamber and adapted to pass wires vertically through the same, and an annular coating trough surrounding said discharge pipe immediately below the lower set of sheaves, which are adapted to carry the wire through an insulating compound contained in said trough.

11. In a wire-coating machine, the combination with a vertical furnace chamber and a pedestal support therefor, of rods extending downwardly from said furnace chamber, carrying frames mounted to slide upon said rods and adjustably secured thereto, and wire-carrying sheaves having trunnions removably held in bearings in said frames.

12. In a wire-coating machine, the combination with a vertical annular furnace chamber, and a central pedestal support therefor, of wire-carrying sheaves radially-mounted below said furnace chamber, vertical supporting bars at the sides of said pedestal, and an annular coating trough arranged to slide vertically on said bars below said sheaves, and means for securing said trough in its various positions of adjustment.

13. In a wire coating machine, the combination with a wire carrying sheave, of a guide pulley frame pivotally mounted concentric to and inclosing the wire as it is led from said sheave, a guide pulley mounted in said frame over which the wire passes as it emerges from said frame, the groove of said guide pulley being in alinement with the axis of rotation of said frame, an extending arm carried by said frame and a second guide pulley carried by said extending arm with its axis at an angle to the axis of the first mentioned guide pulley and with its groove in alinement with the groove of said first mentioned guide pulley.

14. In a machine of the class described, the combination with a furnace comprising concentric cylinders of refractory material, forming an annular furnace chamber, and having spacers at intervals in said furnace chamber dividing the same into segmental compartments, of wire coating mechanisms associated with said furnace and guide means, one for each segment of said furnace chamber for passing the coated wire through said furnace.

15. The combination with a cylindrical furnace, of radially-disposed sheaves arranged to pass wires longitudinally through said furnace at intervals around its circumference, means for coating the wires with insulating compound just before they enter the furnace, and guide-pulleys over which the wire is drawn away from the furnace, said guide-pulleys having pivoted frames whereby they may deliver the wire at various angles.

In witness whereof, I hereunto subscribe my name this 18th day of October, A. D. 1907.

GEORGE GUSTAVE.

Witnesses:
RALPH G. JOHANSEN,
E. F. BEAUBIEN.